（12）United States Patent
Yuyama

(10) Patent No.: US 10,583,604 B2
(45) Date of Patent: Mar. 10, 2020

(54) 3D PRINTER

(71) Applicant: Seiichi Yuyama, Kyoto (JP)

(72) Inventor: Seiichi Yuyama, Kyoto (JP)

(*) Notice: Subject to any disclaimer, the term of this patent is extended or adjusted under 35 U.S.C. 154(b) by 352 days.

(21) Appl. No.: 15/120,537

(22) PCT Filed: Feb. 25, 2015

(86) PCT No.: PCT/JP2015/055360
§ 371 (c)(1),
(2) Date: Aug. 22, 2016

(87) PCT Pub. No.: WO2015/129733
PCT Pub. Date: Sep. 3, 2015

(65) Prior Publication Data
US 2017/0008230 A1 Jan. 12, 2017

(30) Foreign Application Priority Data
Feb. 25, 2014 (JP) ................. 2014-033906

(51) Int. Cl.
B29C 64/20 (2017.01)
B29C 64/106 (2017.01)
(Continued)

(52) U.S. Cl.
CPC .......... B29C 64/106 (2017.08); B29C 64/386 (2017.08); B33Y 30/00 (2014.12);
(Continued)

(58) Field of Classification Search
CPC ..... B29C 64/106; B29C 64/386; B33Y 30/00; B33Y 50/02
See application file for complete search history.

(56) References Cited

U.S. PATENT DOCUMENTS 4,721,589 A  1/1988  Harris
5,121,329 A * 6/1992 Crump .................. B22F 3/115
228/180.5
(Continued)

FOREIGN PATENT DOCUMENTS

CN  1521793  8/2004
CN  201516694  6/2010
(Continued)

OTHER PUBLICATIONS

International Search Report completed May 27, 2015 in PCT/JP2015/055360.
(Continued)

Primary Examiner — Joseph S Del Sole
Assistant Examiner — Jamel M Nelson
(74) Attorney, Agent, or Firm — Beyer Law Group LLP

(57) ABSTRACT

Provided is a 3D printer which can use pellets of various materials and produce a large molded object without requiring an inactive gas. The printer is equipped with: an extrusion apparatus, having a nozzle provided on a lower end side of a cylinder, a screw arranged in the cylinder and controllably rotated by a screw motor, a gear pump provided on a tip side of the screw and controllably rotated by a gear pump motor, a heater for heating an inside of the cylinder, and a hopper for supplying a resin material into the cylinder; a table apparatus positioned facing the nozzle of the extrusion apparatus; and a control apparatus for controlling discharge of a resin from the nozzle of the extrusion apparatus, and for controlling a movement of the extrusion apparatus and/or the table apparatus in X-axis, Y-axis, and Z-axis directions with respect to a reference plane. The extrusion apparatus and/or the table apparatus has a structure moved through position control in the X-axis, Y-axis, and Z-axis directions by the control apparatus.

16 Claims, 2 Drawing Sheets

(51) Int. Cl.
*B33Y 30/00* (2015.01)
*B33Y 50/02* (2015.01)
*B29C 64/386* (2017.01)
*B29K 55/02* (2006.01)
*B29K 67/00* (2006.01)

(52) U.S. Cl.
CPC .......... *B33Y 50/02* (2014.12); *B29K 2055/02* (2013.01); *B29K 2067/046* (2013.01)

(56) References Cited

U.S. PATENT DOCUMENTS

| | | | |
|---|---|---|---|
| 2003/0034577 A1* | 2/2003 | Seta | B29C 45/46 264/40.3 |
| 2004/0032040 A1 | 2/2004 | Harris | |
| 2004/0228970 A1 | 11/2004 | Maruyama | |
| 2011/0146884 A1 | 6/2011 | Burg | |
| 2012/0080814 A1 | 4/2012 | Sun | |
| 2012/0251688 A1 | 10/2012 | Zimmerman | |

FOREIGN PATENT DOCUMENTS

| | | | |
|---|---|---|---|
| CN | 103341974 | 10/2013 | |
| JP | 09024552 | 1/1997 | |
| JP | 2000289084 | 10/2000 | |
| JP | 2005-201215 | 7/2005 | |
| JP | 2006-192710 | 7/2006 | |
| JP | 2007-031733 | 2/2007 | |
| JP | 2008023847 | 2/2008 | |
| JP | 2008-194168 | 8/2008 | |
| JP | 2010-099494 | 5/2010 | |
| JP | 2013-534481 | 9/2013 | |
| JP | 2013-534481 A * | 9/2013 | ............. B29C 47/92 |
| WO | 9724217 | 7/1997 | |
| WO | 2012001492 | 1/2012 | |

OTHER PUBLICATIONS

European Search Report issued in corresponding European application No. 15755380.1 dated Oct. 9, 2017.

* cited by examiner

3D PRINTER

TECHNICAL FIELD

The present invention relates to a three-dimensional printer, and particularly the structure of a material extrusion part of a three-dimensional printer (3D printer) for producing a three-dimensional molded object with a fused deposition modeling method.

BACKGROUND ART

Heretofore, as a method for producing a three-dimensional molded object with a fused deposition modeling method, for example, the following Patent Document 1 discloses a method for producing a minute three-dimensional medical structure. In this method, while the movements of a minute syringe and molding stage facing the syringe are controlled based on the shape data of a three-dimensional structure, a minute medical three-dimensional structure is formed by repeating a step of discharging a thinning thermally fused product made of a biodegradable resin from a syringe nozzle. Further, the following Patent Document 2 discloses a method for forming a three-dimensional structure requiring no filament-like material. In the method, a thermally melted polymer material is extruded from a nozzle using a gas pressurization dispenser, and the discharge position of the nozzle at this time is controlled.

However, the method described in Patent Document 1 decreases the volume of the resin stored in the syringe, which causes a problem that a large molded object cannot be produced. The method of Patent Document 2 makes it necessary to prepare nitrogen or carbon dioxide as a gas inactive against the polymer material in order to suppress the generation of an oxide caused by thermal decomposition, and makes it difficult to control the discharge of the resin since the fused resin is extruded by gas pressurization, which is disadvantageously apt to cause resin dripping from the tip of the nozzle.

Furthermore, in the production of a three-dimensional molded object using a three-dimensional printer which has been widely used in these days, PLA (polylactic acid) provided in a filament form or a filament of ABS (acrylonitrile-butadiene-styrene) is used as a material to be laminated. This filament is pressurized by a feed motor, and extruded from the tip of the nozzle via the heated block, to form a molded object. However, the conventional three-dimensional printer using such a filament is less likely to control the sending speed of the filament, and is apt to cause the clogging of the filament. The nozzle clogging disadvantageously stops a forming step and limits the material suitable for the filament, which makes it impossible to use pellets (granular materials) made of various commercially available materials.

PRIOR ART DOCUMENTS

Patent Documents

Patent Document 1: JP-A-2010-99494
Patent Document 2: JP-A-2008-194968

SUMMARY OF THE INVENTION

Problems to be Solved by the Invention

The present invention solves the problems in the conventional technique, and the object of the present invention is to provide a three-dimensional printer which can use pellets made of various materials and produce a large molded object without requiring an inactive gas.

The present inventor has studied various methods, and as a result, the inventor has found that the following constitution can adjust the amount of a fused resin discharged from a nozzle tip, also prevent resin dripping from the nozzle tip, use commercially available pellets made of wide variety of materials without using a filament made of a restricted material, and is suitable also for producing a large molded object. In the constitution, a fused resin extrusion part in a three-dimensional printer is a small extruder (extrusion apparatus) in which a screw is arranged in a cylinder, a hopper capable of supplying a granular resin material is attached to the extruder, and the rotation of the screw is controlled by a screw motor, and a gear pump provided on the tip side of the screw is controlled by a gear pump motor. The present invention has been completed based on the knowledge.

Means for Solving the Problems

A three-dimensional printer of the present invention which can solve the problems is equipped with:

an extrusion apparatus, having a nozzle provided on a lower end side of a cylinder, a screw arranged in the cylinder and controllably rotated by a screw motor, a gear pump provided on a tip side of the screw and controllably rotated by a gear pump motor, a heater for heating an inside of the cylinder, and a hopper for supplying a resin material into the cylinder;

a table apparatus positioned facing the nozzle of the extrusion apparatus; and a control apparatus for controlling discharge of a resin from the nozzle of the extrusion apparatus, and for controlling a movement of the extrusion apparatus and/or the table apparatus in X-axis, Y-axis, and Z-axis directions with respect to a reference plane;

and wherein the extrusion apparatus and/or the table apparatus has a structure moved through position control in the X-axis, Y-axis, and Z-axis directions by the control apparatus.

The present invention is characterized in that in the three-dimensional printer having the characteristics, a first pressure gauge for measuring resin pressure at a tip position of the screw is provided on the tip side of the screw; a second pressure gauge for measuring resin pressure in the nozzle is provided on a discharge side of the gear pump; and the discharge of the resin from the nozzle is controlled by the control apparatus based on the resin pressures measured with the first and second pressure gauges.

The present invention is characterized in that in the three-dimensional printer having the characteristics, a pressure control apparatus for controlling pressure in the nozzle is provided in the nozzle; volume of an internal space of the nozzle can be changed by the pressure control apparatus. The three-dimensional printer provided with the pressure control apparatus can control a fast response of a resin having viscosity at a nozzle tip, and instantly decrease or increase the pressure in the nozzle.

The present invention is characterized in that in the three-dimensional printer having the characteristics, the pressure control apparatus includes a piston member capable of moving forward and backward in a direction perpendicular to an axial direction of the nozzle, and the pressure control apparatus controls a movement of the piston member to change the volume of the internal space of the nozzle.

Furthermore, the present invention is characterized in that in the three-dimensional printer having the characteristics, the extrusion apparatus is attached to an XY positioning apparatus controllably moved in the X-axis and Y-axis directions by the control apparatus; and the table apparatus is a Z table apparatus controllably moved in the Z-axis direction by the control apparatus.

Effect of the Invention

According to the present invention, the gear pump provided on the tip side of the screw can control the discharge of the resin from the nozzle, correctly control the discharge amount, and laminate the resins to make large molded objects such as a house and a ship. Further, the three-dimensional printer of the present invention can use various commercially available resin pellets without the need for using a filament-like material without regard to the materials, which provides also the wide use of the three-dimensional printer for fused deposition modeling.

MODE FOR CARRYING OUT THE INVENTION

Figure 1:
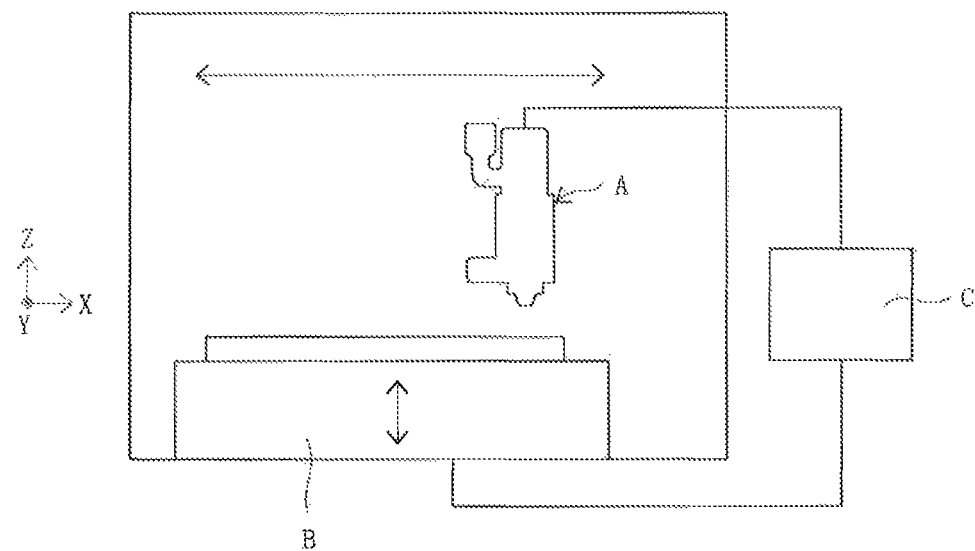
FIG. 1 is a constitution view showing an example of a three-dimensional printer of the present invention.

As shown in FIG. 1, a three-dimensional printer of the present invention is equipped with: an extrusion apparatus A having a mechanism for fusing a pellet by heating, sending a fused resin to the tip side of a nozzle, and controlling the amount of the fused resin discharged from the tip of the nozzle; a table apparatus B positioned facing the nozzle of the extrusion apparatus A; and a control apparatus C for controlling the amount of the fused resin discharged from the nozzle of the extrusion apparatus A, and controlling the movement of the extrusion apparatus A and/or the table apparatus B in X-axis, Y-axis, and Z-axis directions with respect to a reference plane. In this case, in the present invention, any one of the extrusion apparatus A and the table apparatus B may be moved through position control in the X-axis, Y-axis, and Z-axis directions with respect to the reference plane, the position of the other apparatus being fixed, however, as shown in FIG. 1, the extrusion apparatus A may be moved through position control in the X-axis and Y-axis directions with respect to the reference plane, the table apparatus B being moved through position control in the Z-axis direction with respect to the reference plane. The three-dimensional printer of the present invention having the constitution shown in FIG. 1 can be produced by attaching the extrusion apparatus A to a commercially available XY positioning apparatus to allow the control apparatus C to provide position control, disposing a commercially available Z table apparatus at a position facing the nozzle of the extrusion apparatus A to allow the control apparatus C to provide position control.

Figure 2:
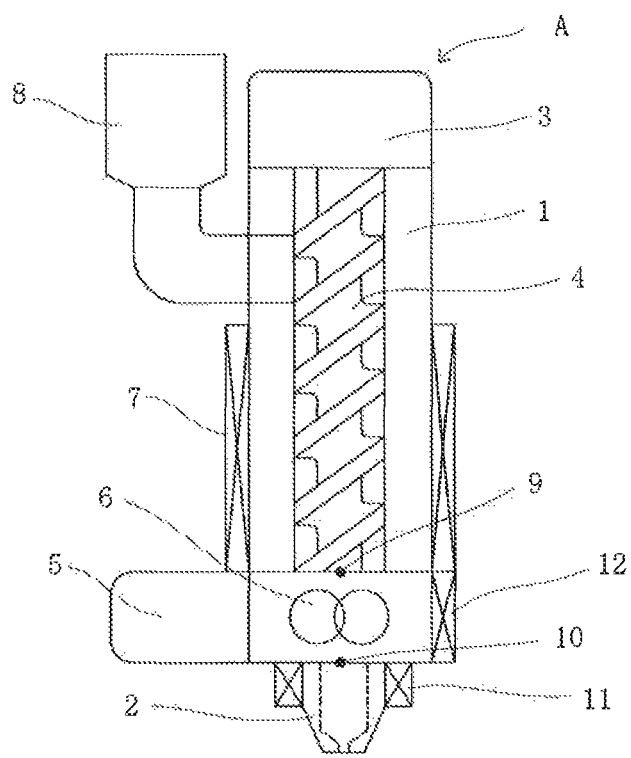
FIG. 2 is a sectional view showing an example of an internal structure of an extrusion apparatus A (material extrusion part) in the three-dimensional printer of the present invention.

FIG. 2 is a sectional view showing the internal structure of the extrusion apparatus A in the three-dimensional printer of the present invention. The extrusion apparatus A is equipped with a nozzle 2 provided on the lower end side of a cylinder 1 arranged to be perpendicular to the table apparatus. A screw 4 controllably rotated by a screw motor 3 and fusing the pellet to supply it to the nozzle side is arranged in the cylinder 1. A gear pump 6 is provided on the tip side of the screw 4, an a heater 7 for heating the inside of the cylinder is provided on the peripheral wall surface of the cylinder 1. A hopper 8 for supplying a resin material into the cylinder is provided on the upper side of the cylinder 1. In the extrusion apparatus A illustrated in FIG. 1, numeral number 11 designates a nozzle heater for constantly keeping the temperature of the fused resin in a nozzle part, and numeral number 12 designates a gear pump heater for constantly keeping the temperature of the fused resin in a gear pump part.

As shown in FIG. 2, the extrusion apparatus A having the structure is equipped with a first pressure gauge 9 for measuring resin pressure at the tip position of the screw, and the first pressure gauge 9 is provided on the tip side of the screw 4. Furthermore, a second pressure gauge 10 for measuring the resin pressure in the nozzle is preferably provided on the discharge side of the gear pump 6. In this case, the control apparatus C controls the screw motor 3 of the extrusion apparatus A, a gear pump motor 5, a heater (cylinder heater) 7, a nozzle heater 11, and a gear pump heater 12 so that the fused resin is stably discharged from the tip of the nozzle based on pressure values measured by the first pressure gauge 9 and the second pressure gauge 10.

Figure 3:
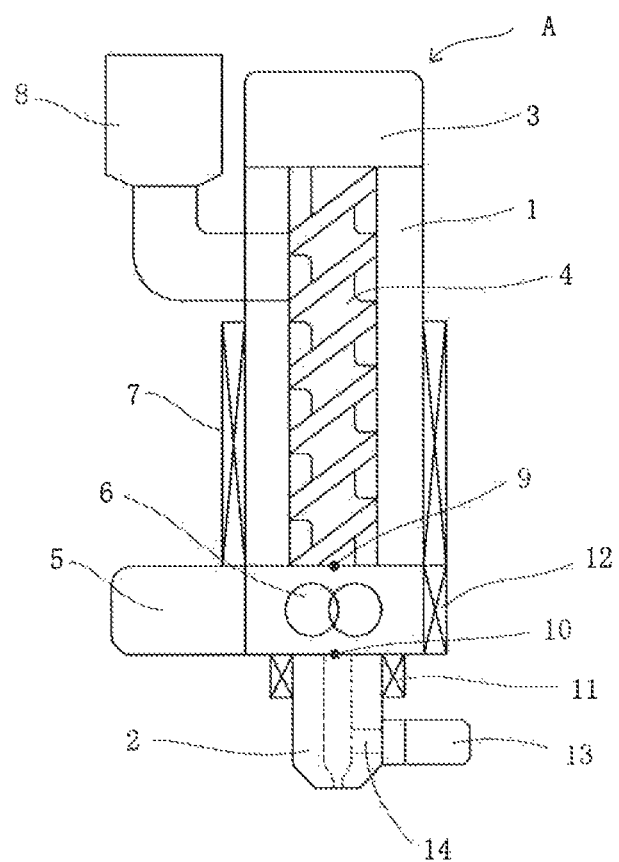
FIG. 3 is a sectional view showing an internal structure of the extrusion apparatus A (material extrusion part) in the three-dimensional printer of the present invention having a structure different from that in FIG. 2.

In the present invention, the pellet placed in the hopper 8 of the extrusion apparatus A is continuously supplied into the cylinder 1. The pellet is fused and kneaded by the rotated screw 4 while being moved to the nozzle 2 side in the heated cylinder 1, and supplied to the gear pump 6 provided on the tip side of the screw 4. In the gear pump 6, the rotation of the gear is controlled by the gear pump motor 5 to discharge a fixed amount of the fused resin from the tip of the nozzle, and the fused resin is sent out by the gear pump 6, which is less likely to cause the clogging of the nozzle. Commercially available gear pumps for extrusion-molding machine can be used as the gear pump 6. In the present invention, when the discharge of the fused resin is stopped, the screw 4 and the gear pump 6 are inversely rotated in a fixed amount to eliminate the pressure in the nozzle, which can effectively prevent resin dripping from occurring from the tip of the nozzle 2. When materials having a low viscosity causing remarkable resin dripping are used, a pressure control apparatus 13 as shown in FIG. 3 is provided in the nozzle 2, to instantly increase the volume of the internal space of the nozzle, which eliminates the pressure in the nozzle. This can effectively prevent resin dripping having a low viscosity. The pressure control apparatus 13 preferably includes a piston member 14 (shown by dotted line in FIG. 3) arranged in the inside of the apparatus. The piston member 14 can be moved forward and backward in a single-axis direction (a direction perpendicular to the axial direction of the nozzle) through position control by the pressure control apparatus 13. The piston member 14 is always at a position (see FIG. 3) in which the nozzle side tip face of the piston member 14 coincides with the inner wall surface of the nozzle. When the pressure in the nozzle is reduced, the piston member 14 is moved in a direction in which the volume of the internal space of the nozzle is increased (in a right side direction of FIG. 3). In contrast, when the pressure in the nozzle is increased, the piston member 14 is extruded in the inner side direction of the nozzle (in a left side direction of FIG. 3) to decrease the volume of the internal space of the nozzle. An actuator driving the piston member 14 may be of a pneumatic type or an electric type, and an electric actuator is desirable in order to correctly control the internal volume of the nozzle.

The pellet-like resin material used for producing a molded object using the three-dimensional printer of the present invention is not particularly limited. Examples of the pellet-like resin material to be used include commercially available pellets made of a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic resin (PLA), a polyphenylene sulfide resin (PPS), and a polyether-ether-ketone (PEEK) or the like.

The sizes (a hopper volume, a screw length, a screw diameter, a unit discharge amount of a gear pump, and a nozzle diameter or the like) of the extrusion apparatus A in the three-dimensional printer of the present invention are appropriately selected according to the size of a molded object to be produced, without particular limitation.

EXAMPLES

Production Example 1 of Three-Dimensional Printer of the Present Invention

A Z-axis table apparatus was produced, which was made of aluminum, included a cartridge heater and a thermo couple to allow temperature control, and included a table that could be elevated by a lead 5 of ϕ20 as a ball screw (manufactured by THK). In this case, a table size was set to a 1,000-mm square, and an elevating range was set to 1,000 mm. On the other hand, an XY motion unit for attaching an extrusion apparatus was assembled with a linear guide (manufactured by THK) and a ball screw (manufactured by THK), and a movement distance in X-axis and Y-axis directions was set to a 1,000-mm square. In this case, as a drive motor for moving the extrusion apparatus in each of the X-axis, Y-axis, and Z-axis directions, a servomotor manufactured by Yasukawa Electric Corporation was used, and a drive motor including a brake was used only for the Z-axis direction. The drive motor was controlled by the control apparatus, to control the positions of the extrusion apparatus on the X, Y, and Z axes. As the extrusion apparatus, a cylinder including a screw L/D20 of ϕ20 mm, provided a discharge amount of 5 kg/h (at 100 rpm), and having a nozzle on a lower end part and a hopper on an upper part side, was used. A geared brushless motor was used in order to drive the screw. Two band heaters of 500 W were used as a cylinder heater for heating a cylinder part. A gear pump having 20 blades having a module pitch of 1 was used, and a geared stepping motor was used in order to drive the gear pump. The diameter of a nozzle hole was set to 1.0 mm. A pressure gauge manufactured by RKC INSTRUMENT INC. rated at 20 MPa was used for first and second pressure gauges for measuring resin pressure. The extrusion apparatus was attached to the XY motion unit, and the discharge of the resin from the nozzle was controlled by the control apparatus, to produce a three-dimensional printer of the present invention having an internal structure shown in FIG. 2.

Preparation Example 1 of Molded Object Using Three-Dimensional Printer of the Present Invention ABS (Toray Toyolac Grade 600, particle diameter: 3 mm) was prepared as a pellet material, and the pellet material was supplied to a hopper by a small auto loader.

A cylinder temperature when the pellet material was extruded using the three-dimensional printer of the present invention produced above was set to 230° C., and a gear pump and nozzle temperatures were set to 240° C.

As a molded object, a full-size model imitating the upper body portion of a human body was used. Data for producing the molded object was input into a control apparatus. When the molded object was produced using the three-dimensional printer of the present invention, the value of a first pressure gauge when a resin was discharged (numeral number 9 of FIG. 2) was controlled to 2 MPa by the control apparatus. When operation for preventing resin dripping was performed, a screw and a gear pump were controlled through inverse rotation so that the value of a second pressure gauge (numeral 10 of FIG. 2) was set to 0.2 MPa or less.

The lamination pitch of a fused resin was set to 0.8 mm. Only a first layer was molded at a molding speed of 40 mm/s. After the molding of the first layer, the molding was performed at a molding speed of 120 mm/s.

When the production of the molded object using the three-dimensional printer was started under environments of room temperature of 23° C. and humidity of 40% under the conditions, the full-size model imitating the upper body portion of the human body could be molded with high accuracy for a molding time of 110 hours.

Production Example 2 of Three-Dimensional Printer of the Present Invention

A Z-axis table apparatus was produced, which had a surface subjected to a blasting treatment, was made of aluminum, included a cartridge heater (total capacity: 5 kw) and a thereto couple, could be controlled through PID by a temperature regulator (manufactured by Omron Corporation). Two 5-mm leads of ϕ25 mm as ball screws for driving (manufactured by THK) were connected so as to be synchronized by a timing pulley and a timing belt. A structure capable of elevating a table was produced using a linear bush (manufactured by THK) and four linear shafts of ϕ30 mm for sliding. In this case, a table size was set to 1200 mm in an X direction and 1200 mm in a Y direction. An elevating range in a Z-axis direction was set to 1,000 mm. On the other hand, an XY gantry unit for attaching an extrusion apparatus was assembled by a linear guide (manufactured by THK) and a 10-mm lead of ϕ20 mm as a ball screw with pressurization (manufactured by THK). A movement distance in an X-axis direction was set to 1,000 mm, and a movement distance in a Y-axis direction was set to 1,000 mm. In this case, as the drive motor for moving the extrusion apparatus in each of the X-axis, Y-axis, and Z-axis directions, a servomotor (1 kw) manufactured by Mitsubishi Electric Corporation was used, and a drive motor including a brake was used for only the Z-axis direction.

The resolution of a drive amplifier of the servomotor was set to 10,000 pulses/rotation, and the theoretical minimum resolution was set to 0.5 μm per pulse on the Z-axis, and 1 μm per pulse on the X and Y axes. The servomotor drive amplifier was controlled by a control apparatus to control the positions of the extrusion apparatus on the X, Y, and Z axes. As the extrusion apparatus, a cylinder including a fill flight screw L/D20 of ϕ20 mm and having a nozzle on a lower end part and a hopper on an upper part side, was used. A brushless motor with a reduction gear was used in order to drive the screw. As a cylinder heater for heating the cylinder part, two band heaters of 500 W were used, and the cylinder part was divided into two zones of a hopper and gear pump sides to allow control by the thermo couple and the temperature regulator. A gear pump made of high-speed steel and having 20 blades having a module pitch of 1 was used for both a gear and a housing. A stepping motor with a ⅕ reduction gear was used in order to drive the gear pump. Micro step setting of a stepping motor driver was set to 1/16, and the control of the discharge amount was allowed at a dividing angle of 0.03 degree or less per pulse. The diameter of a nozzle hole was set to 1.0 mm, and a pressure gauge (manufactured by RKC INSTRUMENT INC.) rated at 20 MPa was used for first and second pressure gauges for measuring resin pressure. A heater of 300 W was used for the gear pump, and a heater of 150 W was used for the nozzle, to allow control by the thermo couple and the temperature regulator. The extrusion apparatus was attached to the XY gantry unit, and the discharge of the resin from the nozzle was controlled by the control apparatus, to produce a three-dimensional printer of the present invention having an internal structure shown in FIG. 3.

Preparation Example 2 of Molded Object Using Three-Dimensional Printer of the Present Invention Polylactic acid (NatureWorks Ingeo, particle diameter: about 3 mm) was prepared as a pellet material, and the pellet material was supplied to a hopper by a small auto loader.

A cylinder temperature when the pellet material was extruded using the three-dimensional printer of the present invention produced above was set to 220° C., and a gear pump and nozzle temperatures were set to 215° C.

A table was adjusted so that a distance between a nozzle tip of Z axis coordinate zero and a Z-axis table apparatus was settled in the range of 0.2 to 0.4 mm in the whole area of a square of 1,000 mm as the movable range of X and Y axes.

As a molded object, a full-size model imitating the upper body portion of a human body was used. Data for producing the molded object was input into a control apparatus. When the molded object was produced using the three-dimensional printer of the present invention, the value of a first pressure gauge (numeral number 9 of FIG. 3) when a resin was discharged was controlled to 2 MPa by the control apparatus. When the discharge from a nozzle (numeral number 2 of FIG. 3) was stopped during molding, and operation for preventing resin dripping was performed, inverse rotation was performed at the speed of a screw (numeral number 4 of FIG. 3) of 180 rpm and a rotation angle of 360 degrees, and inverse rotation was performed at the speed of a gear pump (numeral number 6 of FIG. 3) of 12.0 rpm and a rotation angle of 180 degrees. Control was performed to provide movement by 10 mm in a decompression direction at the axial move speed of a resin pressure control apparatus (numeral number 13 of FIG. 3) of 300 mm/second. When the discharge from the nozzle was restarted, right rotation was performed at the speed of the screw (numeral number 4 of FIG. 3) of 180 rpm and a rotation angle of 360 degrees, and right rotation was performed at the speed of the gear pump (numeral number 6 of FIG. 3) of 120 rpm and a rotation angle of 180 degrees. Control was performed to provide movement by 10 mm in a pressure increasing direction at the axial move speed of a piston member (numeral number 14 of FIG. 3) provided in a resin pressure control apparatus (numeral number 13 of FIG. 3) of 300 mm/second.

The lamination pitch of a fused resin was set to 0.6 mm. Only a first layer was molded at a molding speed of 40 mm/s, and after the molding of the first layer, inner filling was performed at 120 mm/s, and the peripheral part of the layer was molded at 60 mm/s. The internal filling rate was set to 10%.

When the production of the molded object using the three-dimensional printer was started under environments of room temperature of 23° C. and humidity of 40% under the conditions, the full-size model imitating the upper body portion of the human body could be molded with high accuracy without causing stringiness from resin dripping for a molding time of 135 hours.

INDUSTRIAL APPLICABILITY

Since the three-dimensional printer of the present invention is less likely to cause the clogging of a nozzle, and can use various commercially available resin pellets as a resin material, the three-dimensional printer can produce a molded object made of various materials, and is also suitable for producing a large molded object.

DESCRIPTION OF REFERENCE SIGNS

A: extrusion apparatus
B: table apparatus
C: control apparatus
1: cylinder
2: nozzle
3: screw motor
4: screw
5: gear pump motor
6: gear pump
7: heater (cylinder heater)
8: hopper
9: first pressure gauge
10: second pressure gauge
11: nozzle heater
12 gear pump heater
13: pressure control apparatus
14: piston member

The invention claimed is:

1. A three-dimensional printer, comprising:
   an extrusion apparatus including:
      a cylinder with a cylinder heater, the cylinder receiving a resin material therein, and the cylinder heater fusing the resin material in the cylinder;
      a screw arranged in the cylinder;
      a screw motor for rotating the screw;
      a gear pump with a gear pump heater, the gear pump being provided on a tip side of the screw;
      a gear pump motor for rotating the gear pump; and
      a nozzle with a nozzle heater; and
   a control apparatus configured to control an amount of a fused resin discharged from a tip of the nozzle of the extrusion apparatus, by controlling a rotation of the screw and a rotation of the gear pump,
   wherein the control apparatus is further configured to inversely rotate the screw and the gear pump by a predetermined amount such that the fused resin is prevented from dropping from the tip of the nozzle when the discharge of the fused resin is stopped during molding.

2. The three-dimensional printer according to claim 1, wherein the gear pump heater, the nozzle heater, and the cylinder heater are configured such that a heating temperature preset to the gear pump heater and the nozzle hater is higher than the heating temperature preset to the cylinder heater.

3. The three-dimensional printer according to claim 1, further comprising:
a first pressure gauge for measuring a first resin pressure at a tip position of the screw, the first pressure gage being provided on the tip side of the screw; and
a second pressure gauge for measuring a second resin pressure in the nozzle, the second pressure gage being provided on a discharge side of the gear pump,
wherein the control apparatus is further configured to control the discharge of the resin from the nozzle based on the first and second resin pressures measured with the first and second pressure gauges, respectively.

4. The three-dimensional printer according to claim 1, further comprising:
a pressure control apparatus provided in the nozzle, the pressure control apparatus controlling a pressure in the nozzle by changing a volume of an internal space of the nozzle.

5. The three-dimensional printer according to claim 4, wherein the pressure control apparatus includes a piston member configured to move forward and backward in a direction perpendicular to an axial direction of the nozzle, and the pressure control apparatus controls a movement of the piston member to change the volume of the internal space of the nozzle.

6. The three-dimensional printer according to claim 1, further comprising:
a table apparatus facing the nozzle of the extrusion apparatus; and
an XY positioning apparatus to which the extrusion apparatus is attached, the XY positioning apparatus being movable in the X-axis and Y-axis directions,
wherein the control apparatus is further configured to control a movement of the XY positioning apparatus and a movement of the table apparatus in the Z-axis direction.

7. The three-dimensional printer according to claim 1, further comprising:
a positioning apparatus to which the extrusion apparatus is attached, the positioning apparatus being movable in the X-axis, Y-axis, and Z-axis directions,
wherein the control apparatus is further configured to control a movement of the positioning apparatus.

8. The three-dimensional printer according to claim 1, further comprising:
a pressure control apparatus including a volume control member provided in the nozzle, the pressure control apparatus driving the volume control member so as to increase a volume of an internal space of the nozzle when the discharge of the fused resin is stopped.

9. A method for operating a three-dimensional printer having an extrusion apparatus including a cylinder with a cylinder heater, a screw inside the cylinder, a screw motor for rotating the screw, a gear pump with a gear pump heater, the gear pump being provided on a tip side of the screw, a gear pump motor for rotating the gear pump, a nozzle with a nozzle heater, and a controller for controlling a rotation of the screw and a rotation of the gear pump, the method comprising:
providing a resin material into the cylinder;
heating the cylinder to fuse the resin material in the cylinder;
rotating the screw to send a fused resin toward the nozzle;
rotating the gear pump to controllably discharge the fused resin through the nozzle;
heating the gear pump and the nozzle while discharging the fused resin;
controlling an amount of the fused resin discharged from a tip of the nozzle, by controlling the rotation of the screw and the rotation the gear pump; and
inversely rotating the screw and the gear pump by a predetermined amount such that the fused resin is prevented from dropping from the tip of the nozzle when the discharge of the fused resin is stopped during molding.

10. The method according to claim 9, wherein the resin material is provided in a form of a pellet.

11. The method according to claim 9, wherein a heating temperature preset for the gear pump and the nozzle is higher than a heating temperature preset for the cylinder.

12. The method according to claim 9, further comprising:
measuring a first resin pressure at a tip position of the screw;
measuring a second resin pressure in the nozzle at a discharge side of the gear pump; and
controlling the discharge of the resin from the nozzle based on the first and second resin pressures.

13. The method according to claim 9, further comprising:
controlling a pressure in the nozzle by changing a volume of an internal space of the nozzle.

14. The method according to claim 13, further comprising:
providing a volume control member in the nozzle; and
driving the volume control member such that the volume of the internal space of the nozzle is increased when the discharge of the fused resin is topped, thereby further preventing dripping of the fused resin.

15. The method according to claim 13, wherein the controlling the pressure in the nozzle includes:
providing a piston member in the nozzle; and
moving the piston member forward and backward in a direction perpendicular to an axial direction of the nozzle so as to change the volume of the internal space of the nozzle.

16. The method according to claim 9, further comprising:
controlling a position of the extrusion apparatus in the X-axis, Y-axis, and Z-axis directions.

* * * * *